(12) United States Patent
Kato et al.

(10) Patent No.: US 10,246,157 B2
(45) Date of Patent: Apr. 2, 2019

(54) INVERTED PENDULUM VEHICLE

(71) Applicant: HONDA MOTOR CO., LTD., Minato-ku, Tokyo (JP)

(72) Inventors: Seiji Kato, Kawagoe (JP); Jun Inada, Fuchu (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 15/665,634

(22) Filed: Aug. 1, 2017

(65) Prior Publication Data

US 2018/0037283 A1 Feb. 8, 2018

(30) Foreign Application Priority Data

Aug. 5, 2016 (JP) ................. 2016-154580

(51) Int. Cl.
| | |
|---|---|
| *B62K 11/00* | (2006.01) |
| *B62H 1/02* | (2006.01) |
| *B62H 1/12* | (2006.01) |
| *B62K 1/00* | (2006.01) |

(52) U.S. Cl.
CPC .............. *B62K 11/007* (2016.11); *B62H 1/02* (2013.01); *B62H 1/12* (2013.01); *B60L 2200/14* (2013.01); *B60L 2220/46* (2013.01); *B60L 2260/34* (2013.01); *B62K 1/00* (2013.01)

(58) Field of Classification Search
CPC .......... B62K 11/007; B62H 1/02; B62H 1/12; B60L 2220/46
See application file for complete search history.

(56) References Cited

U.S. PATENT DOCUMENTS

| | | | |
|---|---|---|---|
| 8,240,407 | B2 | 8/2012 | Takenaka et al. |
| 2014/0353051 | A1 | 12/2014 | Yada et al. |
| 2014/0353941 | A1 | 12/2014 | Muto et al. |

FOREIGN PATENT DOCUMENTS

| | | |
|---|---|---|
| JP | 2013-237327 A | 11/2013 |
| JP | 2014-015122 A | 1/2014 |

*Primary Examiner* — Kevin Hurley
(74) *Attorney, Agent, or Firm* — Carrier Blackman & Associates, P.C.; Joseph P. Carrier; William D. Blackman

(57) ABSTRACT

In an inverted pendulum vehicle, the fore and aft dimension of the vehicle in a forwardly tilted, parked position is minimized. A pivot center line of a base end of a tail wheel arm is located inside a circle centered around a center of a tail wheel and having a radius equal to a distance between the center of the tail wheel and the rotational center line of the drive disks, and with respect to a hypothetical tail wheel arm, a first line is a line extending along the hypothetical tail wheel arm when the vehicle is in the upright position, and a second line is a line extending along the hypothetical tail wheel arm when the vehicle is in the forwardly tilted, park position, the pivot center line being located on or above a bisector of an angle formed by the first line and the second line.

10 Claims, 5 Drawing Sheets

INVERTED PENDULUM VEHICLE

TECHNICAL FIELD

The present invention relates to an inverted pendulum vehicle, and in particular to an inverted pendulum vehicle having a main wheel driven under an inverted pendulum control and a tail wheel positioned behind the main wheel.

BACKGROUND ART

U.S. Pat. No. 8,240,407B2, JP2013-237327A and JP2014-15122A disclose an inverted pendulum vehicle comprising a vehicle body frame, a main wheel combining a plurality of free rollers arranged along a circle such that the rotational center lines of the free rollers are each directed along the tangential line of the circle, a pair of drive disks each carrying a plurality of free rollers configured to engage the free rollers of the main wheel, and a pair of drive units including a pair of electric motors for individually driving the drive disks under an inverted pendulum control. To enable the vehicle to turn with a small turning radius, it is known to provide a tail wheel arm connected to a rear part of the vehicle at a base end thereof so as to be pivotable around a laterally extending rotational center line and a tail wheel rotatably attached to a free end of the tail wheel arm to engage the road surface.

US2014353941A1 discloses a stand for an inverted pendulum vehicle to park the vehicle in a stable condition when the inverted pendulum control is terminated.

In such an inverted pendulum vehicle, owing to the presence of the tail wheel arm and the tail wheel, a relatively large space is required for parking the vehicle. Particularly when the vehicle is parked in a forwardly slanted position, the fore and aft dimension of the parking space becomes significant. Therefore, it is desired to minimize the space required for parking an inverted pendulum vehicle.

SUMMARY OF THE INVENTION

In view of such a problem of the prior art, a primary object of the present invention is to provide an inverted pendulum vehicle that requires a relative small space for parking.

To achieve such an object, the present invention provides an inverted pendulum vehicle, comprising: a vehicle body frame (12); a main wheel (40) combining a plurality of driven rollers (44) arranged along a circle such that rotational center lines of the driven rollers are each directed along a tangential line of the circle; a pair of drive disks (50) rotatably supported by the vehicle body frame around a laterally extending rotational center line (B); a plurality of drive rollers (52) arranged on each drive disk along a circumferential direction and configured to engage the driven rollers of the main wheel in a skewed relationship thereto; a pair of drive units (72, 86) including a pair of electric motors for individually driving the drive disks under an inverted pendulum control; a control unit (102) for controlling the drive units so as to maintain the vehicle body frame in an upright position; a tail wheel arm (110) extending from the vehicle body frame in a rearward direction and having a base end (110A) pivotally attached to a part of the vehicle body frame around a laterally extending pivot center line (A); a tail wheel (126) rotatably supported by a free end of the tail wheel arm; and a stand (28) attached to a part of the vehicle body frame for supporting the vehicle in a forwardly tilted, park position by engaging a road surface; wherein the pivot center line (A) of the base end of the tail wheel arm is located inside a circle (AL) centered around a center (C1) of the tail wheel in the upright position of the vehicle and having a radius which is equal to a distance between the center (C1) of the tail wheel and the rotational center line (B) of the drive disks in side view, and wherein with respect to a hypothetical tail wheel arm having a base end pivotally attached to the rotational center line (B) of the drive disks and a free end supporting a tail wheel, a first line (L1) is defined as a line extending along the hypothetical tail wheel arm when the vehicle is in the upright position, and a second line (L2) is defined as a line extending along the hypothetical tail wheel arm when the vehicle is in the forwardly tilted, park position, the pivot center line (A) of the base end of the tail wheel arm being located on or above a bisector (L3) of an angle (θ) formed by the first line and the second line in side view.

Thereby, in the forwardly tilted, park position, the tail wheel is positioned in a more forwardly position than in the case of the hypothetical tail wheel arm having a pivot center on the rotational center line of the drive disks so that the fore and aft dimension of the vehicle in the park position is reduced.

Preferably, the pivot center line (A) of the tail wheel arm (110) is located below a horizontal line passing through the rotational center line (B) of the drive disks (50), and the pivot center line (A) of the tail wheel arm (110) is located on or adjacent to the first line (L1).

Thereby, the reduction of the fore and aft dimension of the vehicle in the park position can be enhanced, and the length of the tail wheel arm (110) is prevented from becoming excessively great.

Preferably, the tail wheel arm is provided with a pair of side members (116A, 118A) extending along either side of the main wheel, and a bracket (122) connected to free ends of the side members and rotatably supporting the tail wheel.

Thereby, the tail wheel can be positioned on the center line of the vehicle, and a high stiffness can be given to the tail wheel arm while minimizing the weight.

Preferably, the tail wheel arm is provided with an adequate length not to interfere with the main wheel when the vehicle is in the upright position or in the forwardly tilted, park position.

Thereby, the tail wheel arm is prevented from interfering with the main wheel under all conditions.

According to a preferred embodiment of the present invention, the drive disks are rotatably supported by a lower member of the vehicle body frame via a laterally extending disk support shaft (46), and the base end of the tail wheel arm is pivotally supported by the same lower member via a laterally extending arm pivot shaft (112).

Thereby, no extra member is required to be added to the vehicle body frame for supporting the tail wheel arm so that the weight increase and the material cost of the vehicle can be minimized.

Preferably, the lower member comprises a pair of lower side plates positioned on either side of the vehicle body frame and each having a major plane facing sideways.

Thereby, the structure of the vehicle body frame can be simplified, and the weight of the vehicle can be minimized.

The inverted pendulum vehicle may further comprise a pair of foot rests (38) attached to the respective lower side plates.

The foot rests can be provided to the vehicle without adding an extra member to the vehicle body frame.

The vehicle body frame may be provided with a stopper (17) that abuts the tail wheel arm when the vehicle is tilted rearward to a maximum extent.

Thereby, the maximum rearward tilting of the vehicle can be restricted in a both simple and economical way.

The stand (28) may be attached to a front end part of the vehicle body frame and includes a pair of legs (28A) each extending in a downward and outboard direction so as to abut a road surface in the forwardly tilted, park position.

Thereby, the vehicle can be held in the park position in a stable manner at a minimum cost.

DESCRIPTION OF THE PREFERRED EMBODIMENT(S)

Figure 1:
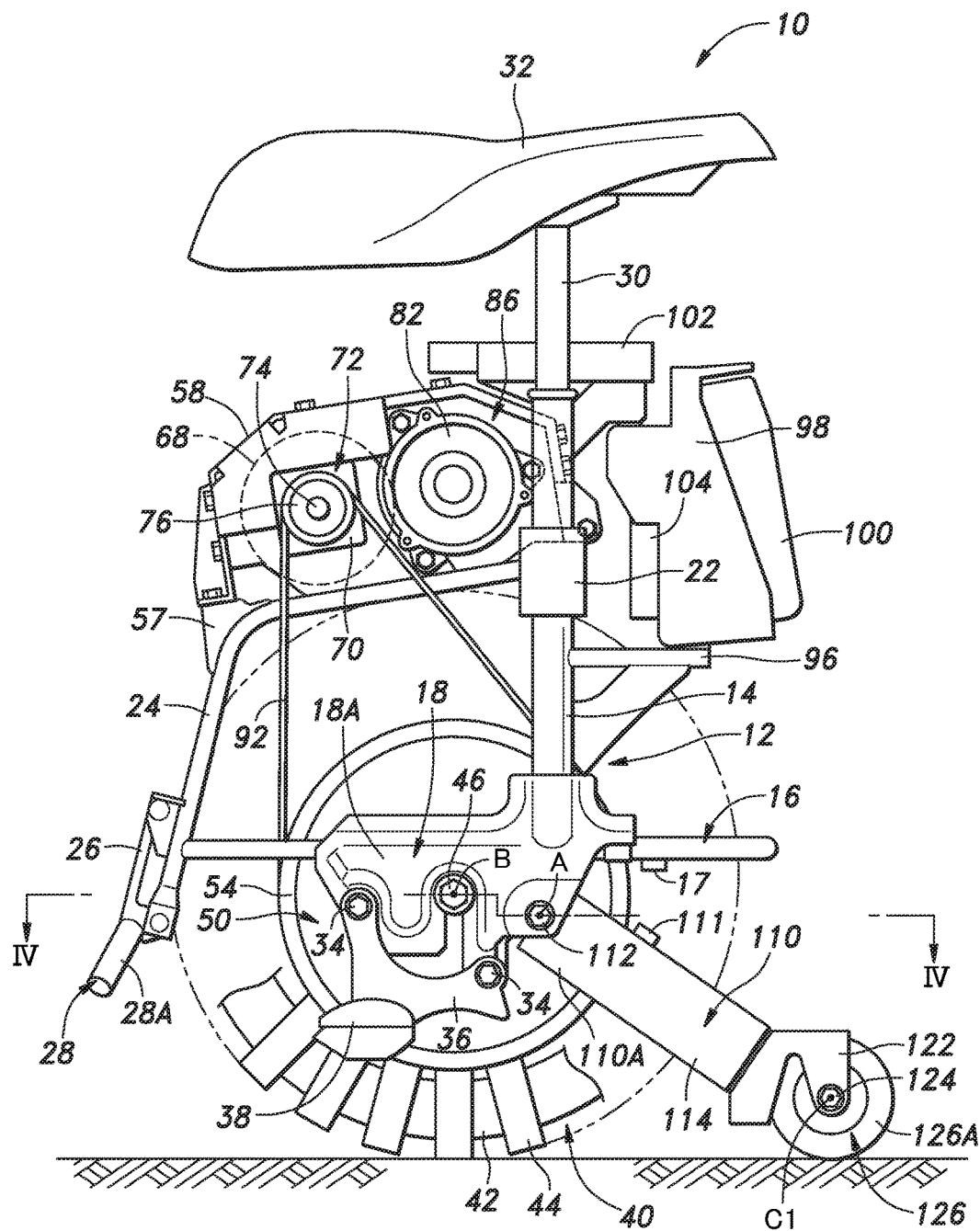
FIG. 1 is a side view of an embodiment of an inverted pendulum vehicle according to the present invention in an upright position.

An embodiment of an inverted pendulum vehicle according to the present invention is described in the following with reference to FIGS. 1 to 4. The directions mentioned in the following description are based on the viewpoint of a rider seated on the inverted pendulum vehicle.

The inverted pendulum vehicle 10 includes a vehicle body frame 12 made of pipe members. The vehicle body frame 12 includes a pair of main posts 14 located on either side of the vehicle, a lower pipe member 16 consisting of a pair of side member sections extending along either side of the vehicle and joined to the lower ends of the respective main posts 14 at intermediate points thereof, and a rear cross member section extending between rear ends of the two side member sections, a pair of lower side plates 18 extending downward from the respective side member sections of the lower pipe member 16, a main cross member 22 extending between intermediate points of the main posts 14, and a pair of side pipe members 24 extending along either side of a main wheel 40 and having rear ends connected to the main cross member 22 and front ends bent downward to be connected to the front ends of the respective side member sections of the lower pipe member 16. The lower side plates 18 each consist of a left plate 18A and a right plate 18B which are located on either side of the main wheel 40.

A saddle 32 is provided with a pair of saddle posts 30 depending therefrom in a laterally spaced apart relationship, and these saddle posts 30 are slidably inserted in the upper ends of the respective main posts 14 in an adjustable manner by means of an adjustment mechanism not shown in the drawings. Each lower side plate 18 is fitted with a foot rest 38 for placing the corresponding leg of the rider. A pair of threaded bolts 34 are used for securing each foot rest 38 to the corresponding lower side plate 18 via a foot rest bracket 36.

A disk support shaft 46 is passed laterally through a hollow center of the main wheel 40, and is pivotally supported by the lower side plates 18 at two ends thereof.

The disk support shaft 46 rotatably supports a pair of drive disks 50 in an individually rotatable manner around a common rotational center line B.

The main wheel 40 is provided with an omni-wheel configuration, and includes a metallic annular member 42 having a laterally extending center line, and a plurality of driven rollers (free rollers) 44 rotatably supported by the annular member 42. Each driven roller 44 is provided with an outer peripheral part made of rubber material, and is rotatable around the tangential line of the annular member 42 at which the particular driven roller 44 is supported.

Figure 4:
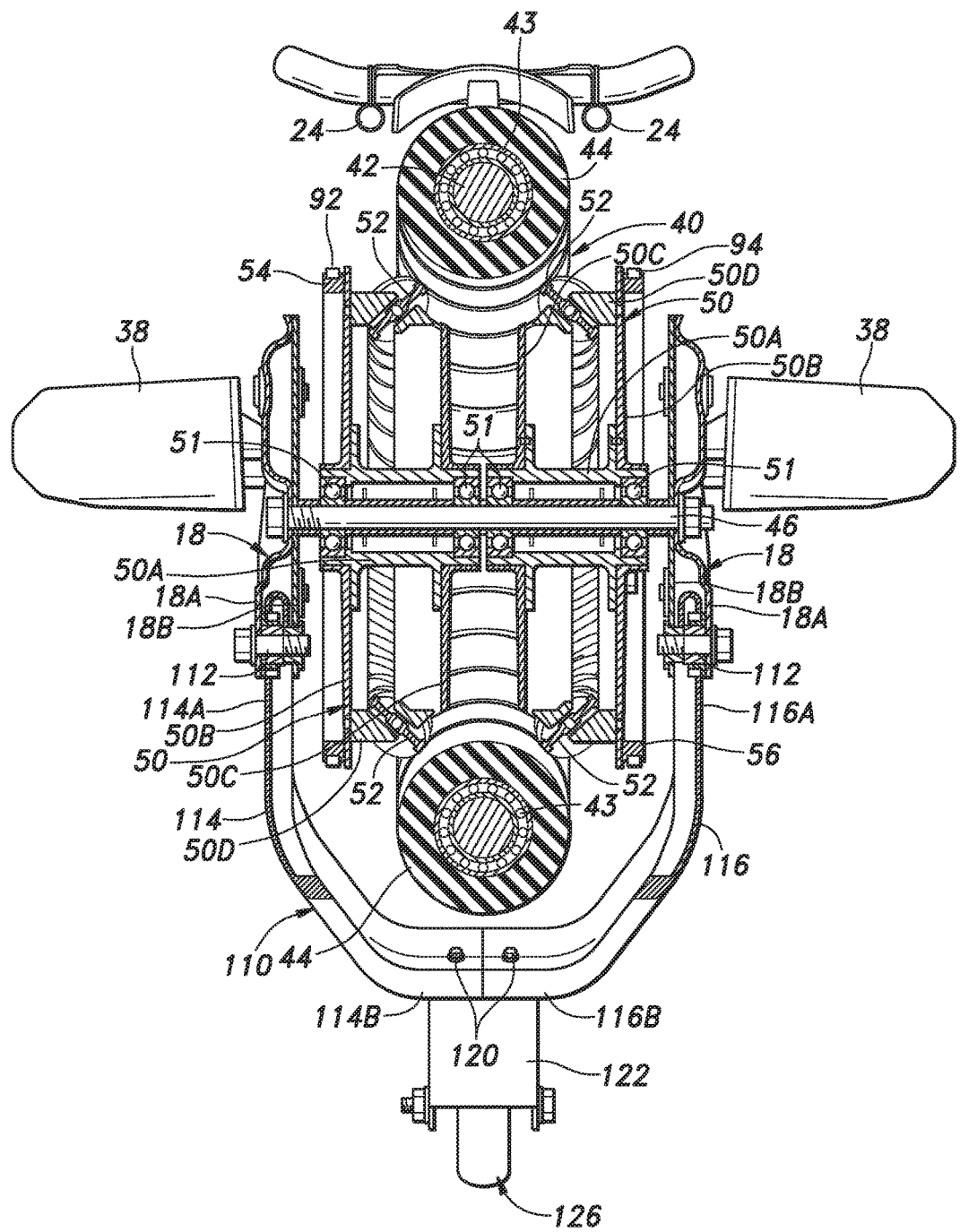
FIG. 4 is a sectional view taken along line IV-IV of FIG. 1.

As shown in FIG. 4, each drive disk 50 is positioned on a corresponding side of the main wheel 40, and includes a hub member 50A supported by the disk support shaft 46 via a pair of roller bearings 51, a circular outer plate 50B attached to an outer end of the hub member 50A, a circular inner plate 50C attached to an inner end of the hub member 50A and a roller support member 50D fixedly secured between the outer plate 50B and the inner plate 50C, all in a coaxial relationship.

A plurality of metallic drive rollers (free rollers) 52 are supported on a peripheral part of each roller support member 50D along a circumferential direction at a regular interval in an individually rotatable manner. The two drive disks 50 along with the drive rollers 52 are arranged in a symmetric manner or as a mirror image of each other, and the rotational center lines of the drive rollers 52 are in a skewed relationship to the rotational center line of the drive disks 50.

The drive rollers 52 of each drive disk 50 are pressed against the outer circumferential surfaces of the driven rollers 44 of the main wheel 40 in a skewed relationship such that the main wheel 40 is rotatably supported around the rotational center line thereof which is substantially coaxial to the rotational center line B of the drive disks 50 (but this does not limit the scope of the present invention). Thus, the main wheel 40 is allowed to rotate around the rotational center line thereof without requiring a pivot shaft.

A driven pulley 54, 56 for a cogged belt is coaxially attached to the outer periphery of each drive disk 50. Any other types of belts and chain links may also be used instead of the cogged belt.

The two bent intermediate parts of the side pipe members 24 are connected to each other by a front cross member 57, and a motor mount member 58 is fixedly attached to the front cross member 57. A left drive unit 72 and a right drive unit 86 are mounted on the side pipe members 24 via the motor mount member 58 one behind the other in a laterally inverted relationship.

The left drive unit 72 includes an electric motor 68 and a speed reduction unit 70. An output shaft 74 of the speed reduction unit 70 is fitted with a drive pulley 76. An endless cogged belt 92 is passed around the left drive pulley 76 and the left driven pulley 54. The right drive unit 86 includes an electric motor 82 and a speed reduction unit 84. An output shaft 88 of the speed reduction unit 84 is fitted with a drive pulley 90. An endless cogged belt 94 is passed around the right drive pulley 90 and the right driven pulley 54.

A rear pipe member 96 extending rearward from the vehicle body frame 12 includes a pair of fore and aft pieces extending rearward from the rear ends of the intermediate points of the respective main posts 14, and a cross piece extending between the rear ends of the fore and aft pieces. A battery box 98 is mounted on the upper side of the rear pipe member 96 to detachably receive a battery 100 therein. The battery 100 and the battery box 98 are positioned behind the two drive units 72 and 86, and between the main wheel 40 and the saddle 32. The battery 100 supplies electric power to the electric motors 68 and 82 and various onboard units such as a main wheel PDU 102.

The main wheel PDU 102 is supported by upper parts of the main posts 14 so as to be positioned immediately under the saddle 32. The main wheel PDE 102 includes a computer for controlling the electric motors 68 and 82 in such a manner that the inverted pendulum control and the propulsion control of the vehicle 10 may be performed according to various sensor signals such as an output signal from a gyro sensor 104 attached to the battery box 98.

When the gravitational center of the vehicle 10 including the rider is at the neutral position (or on the vertical line passing through the rotational center line of the main wheel 40), the electric motors 68 and 82 are driven in such a manner that the vehicle body frame 12 is maintained in an upright posture as shown in FIG. 1.

When the gravitational center of the vehicle 10 including the rider is shifted forward, for instance by the rider leaning forward, the main wheel PDU 102 commands the electric motors 68 and 82 to rotate in the normal direction at a same speed. As a result, the main wheel 40 rotates in the normal direction around the rotational center line thereof, and the vehicle 10 travels straight forward. At this time, as there is no speed difference between the two drive disks 50, the drive rollers 52 of the drive disks 50 and the driven rollers 44 of the main wheel 40 do not rotate around the respective rotational center lines so that no lateral movement takes place.

When the gravitational center of the vehicle 10 including the rider is shifted rearward, for instance by the rider leaning rearward, the main wheel PDU 102 commands the electric motors 68 and 82 to rotate in the reverse direction at a same speed. As a result, the main wheel 40 rotates in the reverse direction around the rotational center line thereof, and the vehicle 10 travels straight rearward. At this time, as there is no speed difference between the two drive disks 50, the drive rollers 52 of the drive disks 50 and the driven rollers 44 of the main wheel 40 do not rotate around the respective rotational center lines so that no lateral movement takes place.

When the gravitational center of the vehicle 10 including the rider is shifted sideways, for instance by the rider leaning sideways, the main wheel PDU 102 commands the electric motors 68 and 82 to rotate in different directions and/or at different speeds. This causes a difference between the rotational speeds of the two drive disks 50. As a result, the driven rollers 44 of the main wheel 40 are driven by the drive rollers 52 of the drive disks 50, and rotate around the rotational center lines of the driven rollers 44.

The rotational speed of the driven rollers 44 depends on the difference between the rotational speeds of the drive disks 50. For instance, when the two drive disks 50 are rotated at a same speed in different directions, the main wheel 40 does not rotate around the rotational center line thereof, and only the driven rollers 44 rotate around the respective rotational center lines. As a result, the vehicle 10 travels sideways. By rotating the drive disks 50 in a same direction at different speeds, the main wheel 40 rotates around the rotational center line thereof, and the driven rollers 44 rotate around the respective rotational center lines at the same time so that the vehicle 10 travels in an oblique direction.

Figure 2:
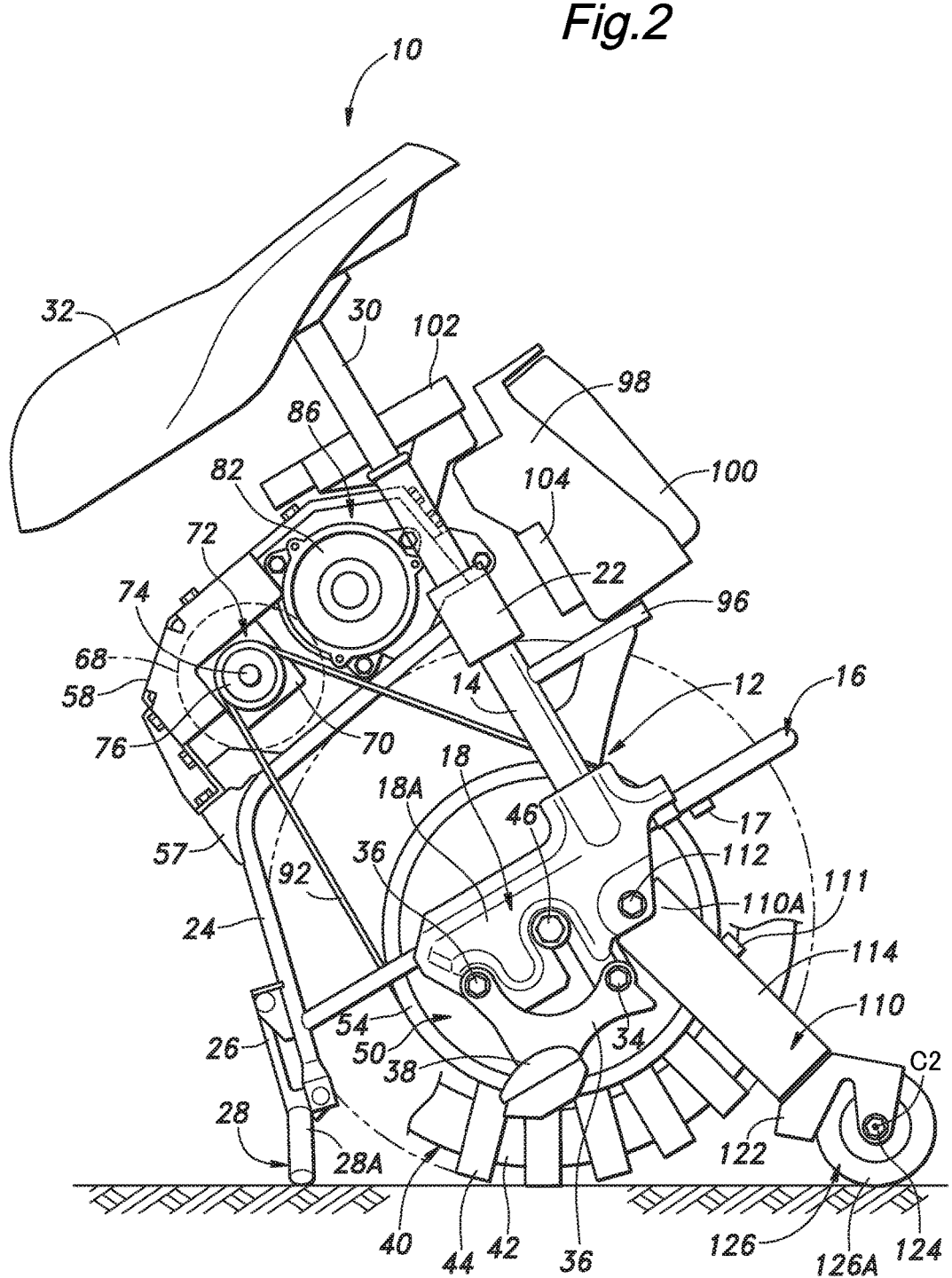
FIG. 2 is a side view of the inverted pendulum vehicle in a forwardly tilted, park position.
Figure 3:
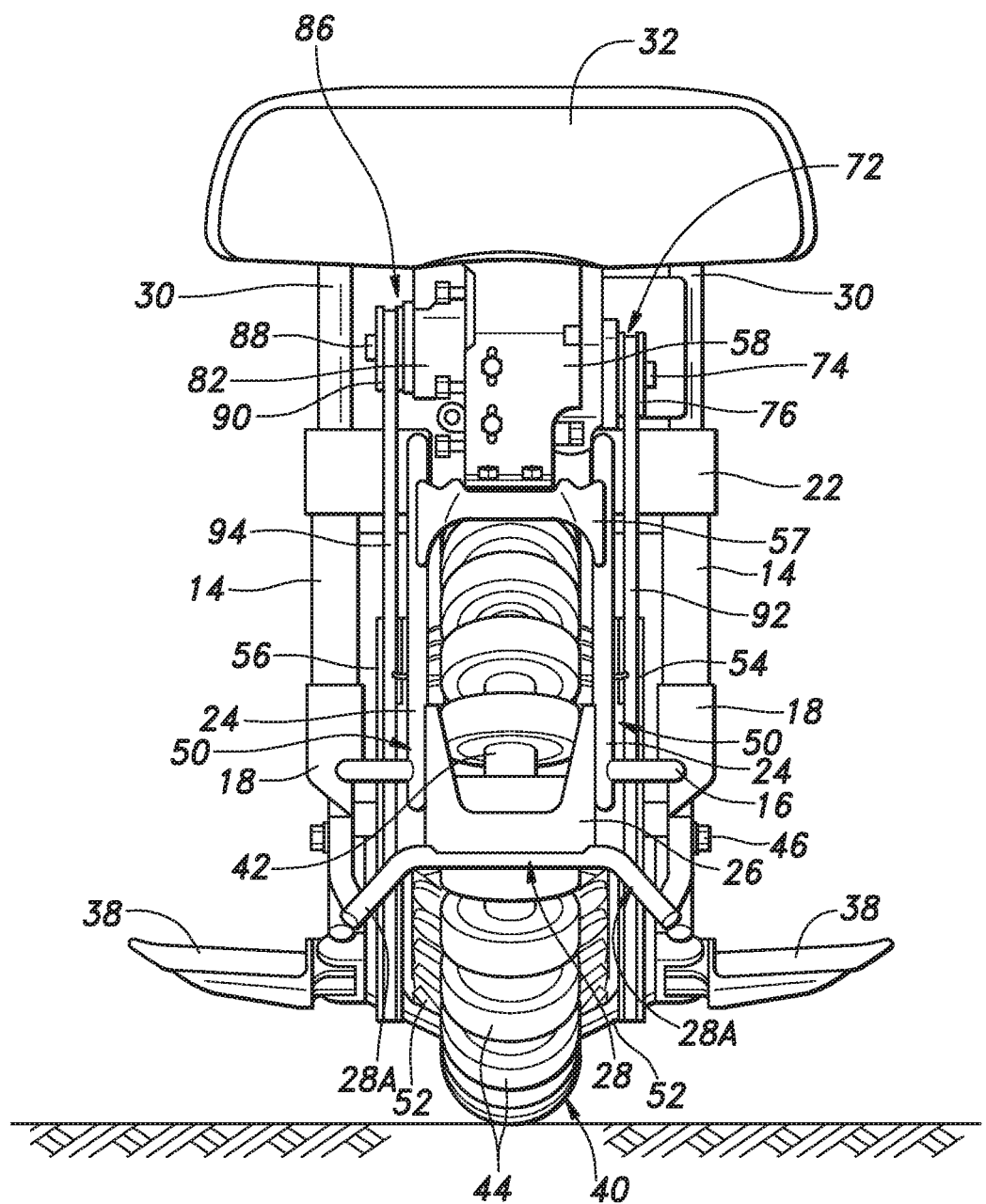
FIG. 3 is a front view of the inverted pendulum vehicle.

The front ends of the side pipe members 24 are connected to each other by a front plate 26 which carries a stand 28. The stand 28 includes a pair of legs 28A extending downward and outward from either side of the stand 28. When the inverted pendulum control is terminated, and the vehicle body frame 12 is tilted forward as shown in FIG. 2, the free ends of the legs 28A abut the ground surface so that the vehicle body frame 12 can be retained in the forwardly tilted, park position in a stable manner. When the vehicle body frame 12 is in the upright position under the inverted pendulum control as shown in FIG. 1, as the legs 28A are substantially spaced away from the ground surface, the stand 28 does not interfere with the movement of the inverted pendulum vehicle 10.

A tail wheel arm 110 is attached to the left and right lower side plates 18. The tail wheel arm 110 comprises a left member 114 and a right member 116 which are pivotally attached to the respective lower side plates 18 at base ends thereof via individual arm support shafts 112 extending laterally and coaxially attached to the respective lower side plates 18. Each of the left member 114 and the right member 116 consists of a plate member having a major plane facing laterally and elongated in the fore and aft direction. The pivoted base end of the tail wheel arm 110 is denoted with numeral 110A in FIGS. 1 and 2.

As shown in FIG. 4, the left member 114 includes a front end part 114A extending rearward from the base end 110A, and a rear end part 114B bent in the inboard direction. Similarly, the right member 116 includes a front end part 116A extending rearward from the base end 110A, and a rear end part 116B bent in the inboard direction. The inboard ends of the two rear end parts 114B and 116B are connected to each other via a bracket 122 fastened to the two rear end parts 114B and 116B with threaded bolts 120. Therefore, the tail wheel arm 110 can be pivotally attached to the lower side plates 18 with an adequate mechanical strength without interfering with the main wheel 40.

The bracket 122 is provided with a pair of side walls, and a laterally extending pivot shaft 124 supported by the two side walls. The pivot shaft 124 rotatably supports a tail wheel 126 provided with a rubber tire 126A. The tail wheel 126 contacts the ground surface at some distance behind the ground contact point of the main wheel 40. The tail wheel 126 assists a yaw movement of the vehicle 10 when the driven rollers 44 of the main wheel 40 are rotated around the corresponding tangential lines of the main wheel 40.

A stopper 111 is attached to the upper edge of each of the left member 114 and the right member 116, and is positioned to abut a stopper 17 attached to a corresponding part of the lower pipe member 16 when the vehicle body frame 12 is tilted backward to a maximum extent.

For the tail wheel 126 to be most effective in producing a yaw movement of the vehicle 10, the tail wheel 126 should be located right behind the main wheel 40. In other words, the main wheel 40 and the tail wheel 126 should be located on a hypothetical plane orthogonal to the lateral direction and dividing the vehicle 10 into two equal parts. Also, the length of the tail wheel arm 110 is determined such that the tail wheel 126 does not interfere with the main wheel 40 without regard to the position of the vehicle 10 or without regard if the vehicle 10 is in the upright position, in the forwardly tilted position or in the rearwardly tilted position.

Conventionally, the pivot center of the tail wheel arm coincided with the rotational center line of the drive disks 50. However, in the illustrated embodiment, as shown in FIG. 5, the pivot center A of the tail wheel arm 110 (which is located in the center of the arm support shaft 112) is rearwardly and downwardly offset from the rotational center line B of the disk support shaft 46.

Figure 5:
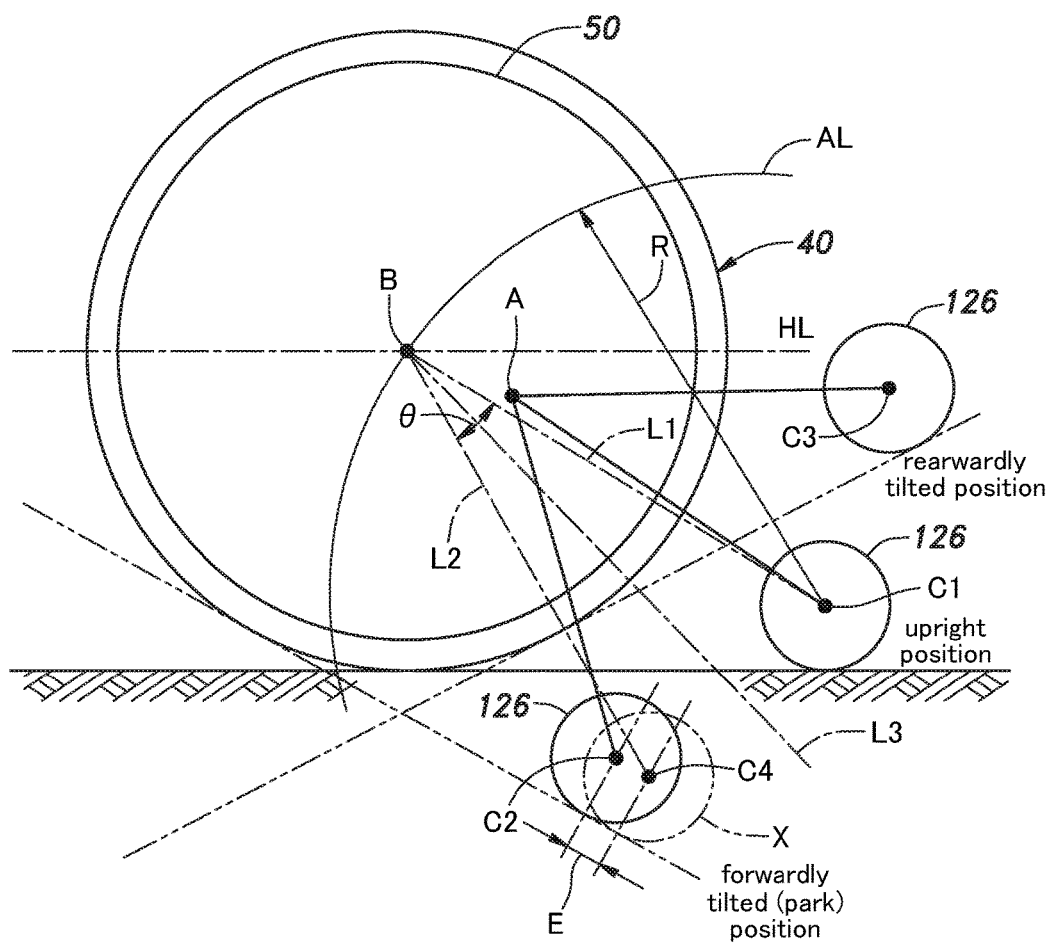
FIG. 5 is a diagram illustrating the various positions of the tail wheel relative to the main body of the inverted pendulum vehicle.

In FIG. 5, the position C1 indicates the position of the tail wheel 126 in the upright position of the vehicle 10, the position C2 indicates the position of the tail wheel 126 in the forwardly tilted, parked position of the vehicle 10 and the position C3 indicates the position of the tail wheel 126 in the most rearwardly tilted position. If the pivot center of the tail wheel arm coincided with the rotational center line B of the drive disk (a hypothetical tail wheel arm), the tail wheel 126 will be located at the position C1 in the upright condition of the vehicle 10, but will be at a position C4 which is displaced rearward from position C2 by a distance E.

Thus, the fore and aft dimension of the vehicle 10 in the parked position can be reduced by the distance E owing to the downwardly and rearwardly offset position of the pivot center A of the tail wheel arm.

In order to ensure this advantage, the pivot center A should be inside a circle AL drawn around the position C1 and having a radius equal to the distance between the rotational center line B of the drive disks 50 and the position C1. A line L3 is given as a bisector of an angle θ formed by a line L1 extending between the rotational center line B of the drive disks 50 and the position C1 and a line L2 extending between the rotational center line B of the drive disks 50 and the position C4. Then, the pivot center A of the tail wheel arm 110 should be located above the line L3. Optionally, the pivot center A of the tail wheel arm 110 may be below a horizontal line passing through the rotational center line B of the drive disks 50.

Preferably, the pivot center A of the tail wheel arm 110 is located on or adjacent to the line L1. By determining the position of the pivot center A of the tail wheel arm 110 in this manner, the rearward projecting distance of the rear end of the tail wheel 126 can be minimized.

Thus, as compared to the case where the pivot center A of the tail wheel arm 110 is located on or near the rotational center line B of the drive disks 50, the fore and aft dimension of the vehicle 10 in the parked position can be minimized By positioning the pivot center A of the tail wheel arm 110 below the horizontal line passing through the rotational center line B of the drive disks 50, the length of the tail wheel arm 110 is prevented from becoming excessively great.

If the tail wheel arm 110 is pivotally supported by the disk support shaft 46, the length of the disk support shaft 46 is required to be increased in order to accommodate a bearing for the pivotal support of the tail wheel arm 110 so that the lateral dimension of the vehicle 10 has to be increased. However, in the illustrated embodiment, the base end of the tail wheel arm 110 is pivotally supported the arm support shafts 112 which are in turn supported by the lower side plates 18. Therefore, the lateral dimension of the vehicle 10 can be minimized.

As the lower side plates 18 support both the disk support shaft 46 and the arm support shafts 112, no additional vehicle body member is required to support the arm support shafts 112 so that the vehicle body structure is prevented from becoming complex. When the pivot center A of the tail wheel arm 110 is located adjacent to the line L1 extending between the rotational center line B of the drive disk 50 and the position C1, the size of the lower side plates 18 can be minimized.

Although the present invention has been described in terms of a preferred embodiment thereof, it is obvious to a person skilled in the art that various alterations and modifications are possible without departing from the scope of the present invention.

For instance, the pivot center A of the tail wheel arm 110 may be located on the line L1 extending between the rotational center line B of the drive disks 50 and the position C1. The tail wheel 126 may also consist of an electrically driven omni-wheel as disclosed in US2014353051A1. The present invention can be applied equally to inverted pendulum vehicles where the diameter of the drive disks 50 is significantly smaller than the inner diameter of the main wheel 40, and the center of the drive disks 50 is significantly offset relative to the center of the main wheel 40.

The invention claimed is:

1. An inverted pendulum vehicle, comprising:
    a vehicle body frame;
    a main wheel combining a plurality of driven rollers arranged along a circle such that rotational center lines of the driven rollers are each directed along a tangential line of the circle;
    a pair of drive disks rotatably supported by the vehicle body frame around a laterally extending rotational center line;
    a plurality of drive rollers arranged on each drive disk along a circumferential direction and configured to engage the driven rollers of the main wheel in a skewed relationship thereto;
    a pair of drive units including a pair of electric motors for individually driving the drive disks under an inverted pendulum control;
    a control unit for controlling the drive units so as to maintain the vehicle in an upright position;
    a tail wheel arm extending from the vehicle body frame in a rearward direction and having a base end pivotally attached to a part of the vehicle body frame around a laterally extending pivot center line;
    a tail wheel rotatably supported by a free end of the tail wheel arm; and
    a stand attached to a part of the vehicle body frame for supporting the vehicle in a forwardly tilted, park position by engaging a road surface;
    wherein the pivot center line of the base end of the tail wheel arm is located inside a circle centered around a center of the tail wheel in the upright position of the vehicle and having a radius which is equal to a distance between the center of the tail wheel and the rotational center line of the drive disks in side view, and
    wherein with respect to a hypothetical tail wheel arm having a base end pivotally attached to the rotational center line of the drive disks and a free end supporting a tail wheel, a first line is defined as a line extending along the hypothetical tail wheel arm when the vehicle is in the upright position, and a second line is defined as a line extending along the hypothetical tail wheel arm when the vehicle is in the forwardly tilted, park position, the pivot center line of the base end of the tail wheel arm being located on or above a bisector of an angle formed by the first line and the second line in side view.

2. The inverted pendulum vehicle according to claim 1, wherein the pivot center line of the tail wheel arm is located below a horizontal line passing through the rotational center line of the drive disks.

3. The inverted pendulum vehicle according to claim 2, wherein the pivot center line of the tail wheel arm is located on or adjacent to the first line.

4. The inverted pendulum vehicle according to claim 3, wherein the tail wheel arm is provided with a pair of side members extending along either side of the main wheel, and a bracket connected to free ends of the side members and rotatably supporting the tail wheel.

5. The inverted pendulum vehicle according to claim 4, wherein the tail wheel arm is provided with an adequate length not to interfere with the main wheel when the vehicle is in the upright position or in the forwardly tilted, park position.

6. The inverted pendulum vehicle according to claim 1, wherein the drive disks are rotatably supported by a lower member of the vehicle body frame via a laterally extending disk support shaft, and the base end of the tail wheel arm is pivotally supported by the same lower member via a laterally extending arm pivot shaft.

7. The inverted pendulum vehicle according to claim 6, wherein the lower member comprises a pair of lower side plates positioned on either side of the vehicle body frame and each having a major plane facing sideways.

8. The inverted pendulum vehicle according to claim 7, further comprising a pair of foot rests attached to the respective lower side plates.

9. The inverted pendulum vehicle according to claim 1, wherein the vehicle body frame is provided with a stopper that abuts the tail wheel arm when the vehicle is tilted rearward to a maximum extent.

10. The inverted pendulum vehicle according to claim 1, wherein the stand is attached to a front end part of the vehicle body frame and includes a pair of legs each extending in a downward and outboard direction so as to abut a road surface in the forwardly tilted, park position.

\* \* \* \* \*